United States Patent
Kaplowitz et al.

(10) Patent No.: US 9,492,870 B2
(45) Date of Patent: Nov. 15, 2016

(54) AEOSOL SYNTHESIS OF FACETED ALUMINUM NANOCRYSTALS

(75) Inventors: Daniel Kaplowitz, Harrington Park, NJ (US); R. Jason Jouet, Indian Head, MD (US); Michael R. Zachariah, Potomac, MD (US)

(73) Assignees: University of Maryland, College Park, College Park, MD (US); United States of America as Represented by the Secretary of the Navy, Washington, DC (US)

( * ) Notice: Subject to any disclaimer, the term of this patent is extended or adjusted under 35 U.S.C. 154(b) by 618 days.

(21) Appl. No.: 13/619,017

(22) Filed: Sep. 14, 2012

(65) Prior Publication Data

US 2013/0129563 A1    May 23, 2013

Related U.S. Application Data

(60) Provisional application No. 61/534,638, filed on Sep. 14, 2011.

(51) Int. Cl.
| | |
|---|---|
| *B22F 9/12* | (2006.01) |
| *C22C 21/00* | (2006.01) |
| *B22F 9/24* | (2006.01) |
| *B82Y 30/00* | (2011.01) |
| *B22F 1/00* | (2006.01) |
| *B22F 9/30* | (2006.01) |

(52) U.S. Cl.
CPC .............. *B22F 9/24* (2013.01); *B22F 1/0018* (2013.01); *B22F 1/0085* (2013.01); *B22F 1/0088* (2013.01); *B22F 9/30* (2013.01); *B82Y 30/00* (2013.01); *C22C 21/00* (2013.01); *B22F 2001/0037* (2013.01); *B22F 2999/00* (2013.01)

(58) Field of Classification Search
CPC .............. C22F 1/04; B22F 9/28; B22F 1/02; B22F 1/0018; B22F 1/0085; B22F 1/0088; B22F 9/24; B22F 9/30; B22F 2999/00; B22F 2201/03; C22C 21/00
See application file for complete search history.

(56) References Cited

U.S. PATENT DOCUMENTS

| | | | | |
|---|---|---|---|---|
| 3,154,407 | A | * | 10/1964 | Ikeda et al. .................... 75/675 |
| 4,923,717 | A | * | 5/1990 | Gladfelter ........... C23C 16/0281 427/252 |
| 2005/0274226 | A1 | * | 12/2005 | Cheng ................... B22F 1/0059 75/362 |

OTHER PUBLICATIONS

Kaplowitz et al. "Aerosol Synthesis and Reactive Behavior of Faceted Aluminum Nanocrystals", Journal of Crystal Growth, 312, p. 3625-3630, available online Sep. 17, 2010.*
Helmich, Richard "Aerosol Synthesis of Energetic Materials", Final Seminar, University of Illinois, Aug. 20, 2010.*
Friedlander, S.K., Smoke, Dust, Haze, Oxford University Press, Inc. New york, 256-7 (2000).
Anderson, I. et al., "Determining the role of surfaces and interfaces in the powder metallurgy processing of aluminum alloy," Surface and Interface Analysis 31 (2001) 599-608.
Baev, A. et al., "Thermodynamics and thermochemistry of organoaluminum compounds", Russian Journal of General Chemistry 72(9), 2002, pp. 1389-1395.

(Continued)

*Primary Examiner* — Lois Zheng
(74) *Attorney, Agent, or Firm* — Ballard Spahr LLP (57) ABSTRACT

Low temperature gas-phase methods for the preparation of faceted aluminum crystals are disclosed.

14 Claims, 11 Drawing Sheets

(56) References Cited

OTHER PUBLICATIONS

Bent, B. et al., "Surface organometallic chemistry in the chemical vapor deposition of aluminum films using triisobutylaluminum: .beta.-hydride and .beta.-alkyl elimination reactions of surface alkyl intermediates", Journal of the American Chemical Society, 111(5), 1989, pp. 1634-1644.

Chan, A. et al., "From chemisorption to mechanism on surfaces: An exploration of the pyrolysis of triisobutylaluminum in the chemical vapor deposition of aluminum thin films":, Journal of Vacuum Science & Technology a—Vacuum Surfaces and Films, 9, 1991, pp. 1569-1580.

Cokoja, M. et al., "Nanometallurgy of Colloidal Aluminides: Soft Chemical Synthesis of $CuAl2$ and $a/\beta$-CuAl Colloids by Co-Hydrogenolysis of $(AlCp^*)4$ with $[CpCu(PMe3)]$", Chemistry of Materials, 18(6), 2006, pp. 1634-1642.

Fernando, K. et al., "Sonochemically assisted thermal decomposition of alane N,N-dimethylethylamine with titanium (iv) isopropoxide in the presence of oleic acid to yield air-stable and size-selective aluminum core-shell nanoparticles", Journal of Physical Chemistry Letters, 113(2), 2009, pp. 500-503.

Fischer, S. et al. 32nd AIAA/ASME/SAE/ASEE Joint Propulsion Conference Jul. 1-3, 1996; Lake Buena Vista, FL.

Haber, J. et al., "Kinetic instability of nanocrystalline aluminum prepared by chemical synthesis—facile room-temperature grain-growth", Journal of the American Chemical Society, 120(42), 1998, pp. 10847-10855.

Ivanov, V. et al., "Synthesis and dynamic compaction of ceramic nano powders by techniques based on electric pulsed-power", Nanostructured materials, 6(1-4), 1995, pp. 287-290.

Jouet, R. et al. "Surface Passivation of Bare Aluminum Nanoparticles Using Perfluoroalkyl Carboxylic Acids," Chemistry of Materials 17 (2005) 2987-2996.

Kaplowitz, D. et al., "Aerosol synthesis and reactive behavior of faceted aluminum nanocrystals", Journal of Crystal Growth, 312, 2010, 3625-3630.

Kearns, M., "Development and applications of ultrafine aluminum powders", Materials Science and Engineering a—Structural Materials Properties Microstructure and Processing, 375, 2004, pp. 120-126.

Kwon, Y. et al., "Ultra-fine powder by wire explosion method," Scripta Materialia, vol. 44, No. 8-9, pp. 2247-2251, 2001.

Mantell, D., "The role of oxygen in chemical vapor deposition nucleation barriers of triisobutylaluminum on silicon", Journal of Vacuum Science & Technology a—Vacuum Surfaces and Films, 7(3), 1989, pp. 630-633.

Park, K. et al., "Size-resolved kinetic measurements of aluminum nanoparticle oxidation with single particle mass spectrometry", Journal of Physical Chemistry B, 109(15), 2005, pp. 7290-7299.

Rai, A., et al. (2006). Understanding the mechanism of aluminum nanoparticle oxidation. Combustion Theory and Modelling, 10(5), 843-859.

Sarathi, R. et al., "Impact of binary gas on nano-aluminium particle formation through wire explosion process," Materials Letters 61 (2007) 1823-1826.

Sindhu, T. (2007). Generation and characterization of nano aluminium powder obtained through wire explosion process. Bulletin of Materials Science, 30(2), 187-195.

Sindhu, T. et al., "Understanding nanoparticle formation by a wire explosion process through experimental and modelling studies," Nanotechnology 19 (2008).

Weigle, J. et al., "Generation of Aluminum Nanoparticles Using an Atmospheric Pressure Plasma Torch", Journal of Physical Chemistry B, 108(48), 2004, pp. 18601-18607.

\* cited by examiner

AEOSOL SYNTHESIS OF FACETED ALUMINUM NANOCRYSTALS

CROSS REFERENCE TO RELATED APPLICATIONS

This application claims the benefit of priority to U.S. Provisional Patent Application Ser. No. 61/534,638, filed on Sep. 14, 2011, which is incorporated by reference in its entirety.

STATEMENT OF GOVERNMENT SUPPORT

This invention was made with government support under N000140710264 and HDTRA10710020 awarded by the Office of Naval Research and the Defense Threat Reduction Agency, respectively, and is jointly owned by the United States of America as represented by the Secretary of the Navy. The government has certain rights in the invention.

TECHNICAL FIELD

The present disclosure relates to aluminum particles and methods for the preparation thereof.

TECHNICAL BACKGROUND

Combinations of metals and oxidizers are of interest as energetic materials due to their high energy content. The high energy density of such materials can make them useful in, for example, propellant applications, where rapid energy release is desired. While aluminum has a high energy density for oxidation to alumina, the oxidation of bulk aluminum materials is diffusion limited. Utilizing small particle size aluminum materials, which have a higher surface to volume ratio, can provide improvements in surface area and reaction rate. Nanosized aluminum materials can be especially reactive due to the high heat of reaction from aluminum to alumina.

Various methods to prepare nanosized aluminum materials have been explored, but such traditional methods typically include a high temperature evaporation step and produce similar types of highly aggregated polycrystalline particles.

Low temperature solution methods have been developed based on the decomposition of aluminum compounds, but a need exists for low temperature gas phase methods for the production of energetic nanosized aluminum materials. This need and other needs are satisfied by the compositions and methods of the present disclosure.

SUMMARY

In accordance with the purpose(s) of the invention, as embodied and broadly described herein, this disclosure, in one aspect, relates to aluminum particles and methods for the preparation thereof.

In one aspect, the present disclosure provides a method for preparing nanosized aluminum particles, the method comprising heating a vapor phase aluminum precursor at a temperature and for a period of time sufficient to convert at least a portion of the vapor phase aluminum precursor to nanosized aluminum particles.

In another aspect, the present disclosure provides faceted nanosized aluminum particles having improved stability and/or enhanced energy release, as compared to conventional nanosized aluminum particles.

BRIEF DESCRIPTION OF THE FIGURES

The accompanying figures, which are incorporated in and constitute a part of this specification, illustrate several aspects and together with the description serve to explain the principles of the invention.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used herein, unless specifically stated to the contrary, the singular forms "a," "an" and "the" include plural referents unless the context clearly dictates otherwise. Thus, for example, reference to "a filler" or "a gas" includes mixtures of two or more fillers, or gases, respectively.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or can not occur, and that the description includes instances where said event or circumstance occurs and instances where it does not.

As used herein, the terms "nano" or "nanosized" is intended to refer to particles or materials having an average particle size of from about 0.01 nanometers to about 1,000 nanometers, or from about 1 nanometer to about 1,000 nanometers, unless specifically stated to the contrary. In other aspects, such terms are intended to refer to materials typically classified as nanosized materials and can have particle sizes less than or greater than any particular value and/or range recited herein. It should also be understood that the particle size for powdered and/or particulate materials can be a distributional property, and that any individual or group of particles can exhibit particle sizes below and/or above the average value.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As briefly described above, the present disclosure provides nanosized aluminum materials and methods for the preparation thereof. In one aspect, the present disclosure provides faceted aluminum crystals and methods for the preparation thereof. In another aspect, such methods can comprise the use of an organoaluminum compound, such as, for example, triisobutylaluminum (TiBAl). In one aspect, such an organoaluminum compound can have a decomposition temperature below the melting point of elemental aluminum. In another aspect, the nanosized aluminum materials can comprise polyhedral crystalline aluminum particles, spherical aluminum particles, or a combination thereof. In other aspects, the use of an annealing furnace can facilitate the production of polyhedral aluminum particles. In another aspect, the nanosized aluminum particles described herein can exhibit less pyrophoric activity than corresponding nanosized spherical aluminum particles. In yet another aspect, the nanosized aluminum particles described herein can exhibit an increase in energy release under combustion tests, as compared to commercially available nanosized aluminum materials. In another aspect, the methods described herein comprise low temperature gas phase methods. In another aspect, such methods can provide for the ability to control the nucleation and growth of nanosized aluminum particles, for example, to provide highly faceted nanosized crystals of aluminum.

As described above, combinations of metals and oxidizers are of interest due to their high energy content, especially as compared to conventional CHNO materials. Metals, such as aluminum, are of particular interest due to their high energy density for oxidation, but in bulk form, the oxidation of such metals is diffusion limited. To mitigate diffusion limited kinetics, small particle size materials can be used, increasing the surface to volume ratio of the material. The resulting increase in surface area, for example, in going from micrometer sized particles to nanometer sized particles, can lead to substantial increases in oxidation reaction rates. In one aspect, almost all reactive metals can be pyrophoric when particle sizes are reduced to less than about 100 nanometers.

Aerosol methods for the preparation of nanosized aluminum particles have been explored, wherein solid pellets of aluminum were evaporated using a DC-arc discharge that created nanosized particles upon quenching with argon gas. Other methods using laser ablation to generate a microplasma have also been explored. Similarly, exploding wire has been utilized for the production of nanosized aluminum particles, wherein a high density current is pulsed through an aluminum wire to create a microplasma, yielding fine aluminum particles when quenched. Each of these methods to prepare nanosized aluminum particles involves the high temperature evaporation of elemental aluminum, followed by a rapid quench. Such methods also produce similar types of highly aggregated polycrystalline particles.

Low temperature solution based methods based on the decomposition of aluminum compounds have also been explored, including the catalytic decomposition of $H_3Al.NMe_3$ in organic solvents. The resulting bare aluminum can be surface passivated with a self assembled monolayer of perfluoroalkyl carboxylic acid to prevent oxidation. Other solution based methods are based on the reaction of $LiAlH_4$ with $AlCl_3$, hydrogenolysis of $(AlCp^*)_4$, thermal decomposition of Alane N,N-Dimethylethylamine, and other similar techniques.

To date, no low temperature gas phase methods have been developed for the preparation of nanosized aluminum particles. The present disclosure provides various low temperature gas phase methods for the production of such materials.

Aluminum Precursor

The aluminum precursor of the present disclosure can comprise any aluminum containing material suitable for use with the methods described herein. In one aspect, the aluminum precursor comprises an organoaluminum compound. In another aspect, the aluminum precursor has a decomposition temperature less than the melting point of elemental aluminum (i.e., 660° C.). In yet another aspect, the aluminum precursor is capable of reacting in the vapor phase to produce products containing aluminum and/or elemental aluminum. In a similar aspect, upon heating to a temperature sufficient to at least partially crack or breakdown the aluminum precursor, all or substantially all carbonaceous by-products remain in the gaseous phase and can pass through a filtration medium. In yet another aspect, the aluminum precursor exhibits a high vapor pressure. In one aspect, the aluminum precursor can comprise triethylaluminum. In another aspect, the aluminum precursor can comprise tri-isobutylaluminum (TiBAl), commonly used in the production of alcohols and olefins, available from Sigma-Aldrich Corp., St. Louis, Mo., USA.

In one aspect, TiBAl can exhibit a high vapor pressure and can decompose at about 250° C. While not wishing to be bound by theory, it is believed that the decomposition of TiBAl includes β-hydride elimination followed by liberation of isobutylene and hydrogen, resulting in the formation of elemental aluminum. In one aspect, the aluminum precursor, for example, TiBAl, can be provided and/or used neat. In other aspects, an organoaluminum compound can be provided and/or used in a monomer form, a dimer form, or a combination thereof.

Gas Phase Reactor

The apparatus and equipment used in the methods of the present invention can comprise any apparatus and equipment suitable for the preparation of aluminum materials using low temperature gas phase techniques. In one aspect, the methods described herein utilize a gas phase reactor, such as, for example, a continuous flow aerosol reactor. In one aspect, all or a portion of the system can comprise a non-reactive material. In another aspect, the connective tubing and valves can comprise stainless steel.

In one aspect, an aluminum precursor can be disposed in a container for subsequent delivery to a furnace. In various aspects, such a container can comprise any material capable of holding the aluminum precursor. In one aspect, the container is not reactive with the aluminum precursor. In one aspect, such a container can comprise stainless steel. In another aspect, such a container can comprise glass. In another aspect, the aluminum precursor can be stored under an inert atmosphere, such as, for example, argon. In one aspect, a blanket of inert gas can be maintained over the surface of the aluminum precursor. In another aspect, the aluminum precursor or a portion thereof can be sparged with an inert gas. In a specific aspect, the aluminum precursor can be disposed in a bubbler, through which a metered flow of argon is bubbled. In yet another aspect, the container in which all or a portion of the aluminum precursor is disposed can be heated. In one aspect, the aluminum precursor can be heated to a temperature below its decomposition temperature. In various aspects, the aluminum precursor can be heated to about 40° C., about 50° C., about 60° C., about 70° C., about 80° C., or about 90° C. In one aspect, heating the aluminum precursor can increase the production rate of nanosized aluminum particles. It should be noted that higher temperatures can potentially lead to decomposition of at least a portion of the aluminum precursor. Thus, in one aspect, the aluminum precursor can be heated to a temperature sufficient to improve the production rate of aluminum materials, but below that where substantial decomposition of the aluminum precursor can occur.

In one aspect, the temperature of the aluminum precursor can be maintained using a temperature control system, such as a thermocouple placed in a thermowell built into the container.

In one aspect, the aluminum precursor and/or the resulting nanosized aluminum material can be reactive and/or sensitive to air and/or water. In such an aspect, one or more valves can be positioned within the system to maintain an inert atmosphere and prevent the introduction of air or water. In one aspect, such a valved system can allow flushing with an inert gas, such as, for example, argon, prior to and/or after each production run. In another aspect, all or a portion of the apparatus can be heated and/or jacketed so as to reduce or prevent condensation of the precursor within the reactor system. In one aspect, all or a portion of the system can be heated to and/or maintained at a temperature sufficient to prevent condensation of the vapor phase aluminum precursor. In another aspect, all or a portion of the system can be heated to and/or maintained at at temperature equal to or higher than that of the container in which the aluminum precursor material is placed. In still other aspects, all or a portion of the system can be heated to or maintained at a temperature up to about 85° C., for example, about 40, 45, 50, 55, 60, 65, 70, 75, 80, or 85° C.

The aluminum precursor can be introduced in the vapor phase to a heated reaction zone capable of decomposing all or a portion of the aluminum precursor into a desirable nanosized aluminum material. In one aspect, a flow of inert gas can be passed through the aluminum precursor, as described above, so as to carry a portion of the aluminum precursor in the vapor phase to the heated reaction zone. In other aspects, a pressure differential between the inlet and outlet of the reactor system can be established so as to convey vapor phase aluminum precursor through the system. In yet another aspect, the flow rate of aluminum precursor through the heated reaction zone can be controlled so as to produce nanosized aluminum particles having a desired particle size. In another aspect, one or more additional gases can be introduced prior to or in the heated reaction zone so as to adjust the flow rate and/or concentration of aluminum precursor. In one aspect, the flow rate of aluminum precursor into the heated reaction zone can be from about 1 liters per minute (lpm) to about 4 lpm, for example, about 1, 1.25, 1.5, 1.75, 2, 2.25, 2.5, 2.75, 3, 3.25, 3.5, 3.75, or 4 lpm; or from about 2 lpm to about 4 lpm, for example, about 2, 2.25, 2.5, 2.75, 3, 3.25, 3.5, 3.75, or 4 lpm. In another aspect, the flow rate of aluminum precursor into the heated reaction zone can be about 3 lpm.

In another aspect, the residence time of the vapor phase aluminum precursor in the heated reaction zone can be from about 1 to about 10 seconds, for example, about 1, 2, 3, 4, 5, 6, 7, 8, 9, or 10 seconds; or from about 2 to about 6 second, for example, about 2, 3, 4, 5, or 6 seconds. In another aspect, the residence time of the vapor phase aluminum precursor in the heated reaction zone can be about 4 seconds.

In one aspect, the heated reaction zone can comprise a furnace, such as, for example, a tube furnace. In another aspect, the heated reaction zone is closed so as to prevent the introduction of air and/or water into the system. In a specific aspect, the heated reaction zone comprises a tube furnace having, for example, a quartz tube. The length and diameter of such a tube can be any dimensions suitable for use in preparing a desired nanosized aluminum material. In various aspects, a tube furnace can be about 15.5 inches long and utilize a quartz tube having a diameter of from about 0.5 inches to about 2 inches, for example, about 0.5, 0.75, 1, 1.25, 1.5, 1.75, or 2 inches; or from about 0.5 inches to about 1.5 inches, for example, about 0.5, 0.75, 1, 1.25, or 1.5 inches. In other aspects, tubes having diameters smaller or larger than those recited herein can be used, depending upon the desired scale of production. In one aspect, one of skill in the art, in possession of this disclosure, could readily select an appropriate furnace or tube.

The temperature of the heated reaction zone can vary according to the specific aluminum precursor, flow rate, and desired particle size of the resulting product. In one aspect, the temperature of the heated reaction zone can be from about 275° C. to about 600° C., for example, about 275, 300, 325, 350, 375, 400, 425, 450, 475, 500, 525, 550, 575, or 600° C.; from about 300° C. to about 550° C., for example, about 300, 325, 350, 375, 400, 425, 450, 475, 500, 525, or 550° C.; from about 300° C. to about 400° C., for example, about 300, 310, 320, 330, 340, 350, 360, 370, 380, 390, or 400° C. In a specific aspect, the temperature of the heated reaction zone can be about 350° C. It should be appreciated that the flow rate, residence time, and temperature of the aluminum precursor in the heated reaction zone are related and that each can be adjusted so as to achieve desirable aluminum particles. In the heated reaction zone, all or a portion of the vapor phase aluminum precursor is converted to nanosized aluminum particles. In various aspects, aluminum particles produced in the heated reaction zone can comprise a polyhedral morphology, a spherical morphology, or a combination thereof.

After passing through the heated reaction zone, the aluminum precursor and/or converted aluminum particles can be passed through an optional second heated zone. In one aspect, the optional second heated zone can assist in conversion of at least a portion of spherical aluminum particles, if present, into polyhedral aluminum particles.

In one aspect, the second heated zone can comprise a furnace, such as, for example, a tube furnace that is the same as or different from that used for the heated reaction zone.

In one aspect, the flow rate of aluminum precursor and/or converted aluminum particles into the optional second heated zone can be the same as or different from that used in the heated reaction zone. In another aspect, the flow rate of aluminum precursor and/or converted aluminum particles into the optional second heated zone can be from about 0.5 lpm to about 4 lpm, for example, about 0.5, 0.75, 1, 1.25, 1.5, 1.75, 2, 2.25, 2.5, 2.75, 3, 3.25, 3.5, 3.75, or 4 lpm; or from about 1 lpm to about 3 lpm, for example, about 1, 1.25, 1.5, 1.75, 2, 2.25, 2.5, 2.75, or 3 lpm. In another aspect, the flow rate of aluminum precursor and/or converted aluminum particles into the second heated zone can be about 1.5 lpm.

In another aspect, the residence time of the aluminum precursor and/or converted aluminum particles in the second heated zone can be from about 0.5 to about 10 seconds, for example, about 0.5, 0.75, 1, 2, 3, 4, 5, 6, 7, 8, 9, or 10 seconds; or from about 1 to about 4 second, for example, about 1, 2, 3, or 4 seconds. In another aspect, the residence time of the aluminum precursor and/or converted aluminum particles in the second heated zone can be about 2 seconds.

In another aspect, the second heated zone is closed so as to prevent the introduction of air and/or water into the system. In yet another aspect, a dump valve can be positioned between the heated reaction zone and the optional second heated zone. In various aspects, the dump valve can be utilized to adjust and/or maintain the flow rate and/or residence time in the second heated zone. For example, a dump valve can be opened to allow a portion of the gas, aluminum precursor, aluminum particles, or a combination thereof to exit the system so as to have a lower flow rate in the second heated zone (e.g., second tube furnace) as compared to the heated reaction zone (e.g., first tube furnace). In another aspect, a dump valve can be used for only a portion of an experiment, for example, at the beginning of an experiment so as to adjust flow rates. In other aspects, the dump valve can be periodically or continuously adjusted during the course of an experiment so as to achieve a desired flow rate and/or residence time. In another aspect, a dump valve is not needed of utilized. The length and diameter of such a tube can be any dimensions suitable for use in preparing a desired nanosized aluminum material. In various aspects, a tube furnace can be about 15.5 inches long and utilize a quartz tube having a diameter of from about 0.5 inches to about 2 inches, for example, about 0.5, 0.75, 1, 1.25, 1.5, 1.75, or 2 inches; or from about 0.5 inches to about 1.5 inches, for example, about 0.5, 0.75, 1, 1.25, or 1.5 inches. In other aspects, tubes having diameters smaller or larger than those recited herein can be used, depending upon the desired scale of production. In one aspect, one of skill in the art, in possession of this disclosure, could readily select an appropriate furnace or tube.

The temperature of the optional second heated zone can vary according to the specific aluminum precursor, flow rate, and desired particle size and morphology of the resulting product. In one aspect, the temperature of the optional second heated zone can be from about 275° C. to about 600° C., for example, about 275, 300, 325, 350, 375, 400, 425, 450, 475, 500, 525, 550, 575, or 600° C.; from about 300° C. to about 550° C., for example, about 300, 325, 350, 375, 400, 425, 450, 475, 500, 525, or 550° C.; from about 400° C. to about 550° C., for example, about 400, 410, 420, 430, 440, 450, 460, 470, 480, 490, 500, 510, 520, 530, 540, or 550° C. In a specific aspect, the temperature of the second heated zone can be about 450° C.

In one aspect, the temperatures of the heated reaction zone and the optional second heated zone can be adjusted so as to control the morphology of the resulting nanosized aluminum material. In one aspect, raising the temperature of a single heated reaction zone to about 500° C. can result in a nanosized aluminum material comprising substantially spherical particles. In a specific aspect, a heated reaction zone having a temperature of about 350° C., followed by a second heated zone of about 450° C. can produce a nanosized aluminum material having an increased percentage of desirable polyhedral particles. Thus, in one aspect, a two step process, wherein a heated reaction zone at a first temperature is followed by a second heated zone at a higher temperature, can result in a higher percentage of polyhedral aluminum particles. In one aspect, such a two step process can provide a nanosized aluminum material having at least about 85% polyhedral crystals, for example, at least about 85, 87, 89, 91, 93, 95, 97% or more polyhedral crystals; or at least about 92% polyhedral crystals, for example, at least about 92, 93, 94, 95, 96, 97, 98% or more polyhedral crystals.

After passing through the heated reaction zone and optionally the second heated zone, the converted aluminum particles can be collected by any suitable means. In one aspect, the particles can be collected on, for example, a membrane filter. In one aspect, a polypropylene membrane filter having a pore size of about 200 nm can be used (e.g., available from Sterlitech Corporation, Kent, Wash., USA). In another aspect, a filter membrane can be positioned in a filter holder, such as, for example, a Millipore® stainless steel filter holder.

It should be noted that particles prepared in accordance with the methods described herein, in the absence of oxygen, can be highly reactive. Prior to or during collection of the resulting aluminum particles, a small amount of air can, in various aspects, be bled into the system so as to form a thin oxide passivation shell on the particles. In one aspect, air can be introduced into the system so as to create a 1 nm to 3 nm oxide passivation shell on at least a portion of the particles.

In yet other aspects, other species can be introduced into the system after formation of the nanosized aluminum particles, in lieu of or in addition to air, so as to modify the surface of the produced particles and control the reactivity thereof.

If desired, a portion of the aerosol containing aluminum particles can be analyzed via transmission electron microscopy, a scanning mobility particle sizer (SMPS), or a combination thereof.

In one aspect, the nanosized polyhedral aluminum particles produced by the methods of the present disclosure can have average diagonal distances of from about 50 nm to about 100 nm, for example, about 50, 60, 70, 80, 90, or 100 nm. In other aspects, spherical particles produced by the methods of the present disclosure can have average diameters of from about 25 nm to about 50 nm, for example, about 25, 30, 35, 40, 45, or 50 nm. In another aspect, the methods described herein can provide at least about 90% nanosized polyhedral aluminum crystals having an average diagonal size of from about 50 to about 100 nm, and less than about 10% nanosized spherical aluminum particles having an average diameter of from about 25 nm to about 50 nm.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

Typical Operating Conditions

In a first example, typical operating conditions of flow rate and temperature (bubbler temperature for the aluminum precursor) are presented in Table I, below, together with the expected aluminum production rates (assuming complete vapor saturation of the argon flow).

TABLE I

Theoretical production rates for TiBAl decomposition.

| Flow (lpm) | T (° C.) | Vp (Pa) | TiBAl (mg/hr) | Al (mg/hr) |
| --- | --- | --- | --- | --- |
| 1.5 | 50 | 122.6 | 815.1 | 110.9 |
|  | 60 | 281.3 | 1813.5 | 246.6 |
|  | 70 | 439.9 | 2753.4 | 374.5 |

While increasing the temperature of the aluminum precursor can significantly increase the theoretical aluminum production rate, such increases can also result in increased loss and/or decomposition of the precursor.

Example 2

Reactor Design

In a second example, an exemplary reactor system 100 for the preparation of nanosized aluminum particles is provided. With respect to FIG. 1, a 160 liter refrigerated argon cylinder 110 is connected via polytetrafluoroethylene tubing and SWAGELOK® tube fitting connectors to a mass flow controller (e.g., MKS Instruments) 115 and digital controller system. A flow of argon gas, controlled by the mass flow controller and valve 120, is then directed through additional tubing to a bubbler system 125 containing triisobutylaluminum. The bubbler system, available from MDC Vacuum Products Co., comprises a capped-off half nipple with a built in side port connected to a vacuum flange so as to allow thermocouple temperature measurements inside the bubbler. The inlet of the bubbler comprises a tube extending into the bubbler below the liquid level. Both the inlet and outlet ports of the bubbler are connected to one-way valves to allow for sealing and refilling of the bubbler with additional triisobutylaluminum when required. Heating tape and variable transformers are used to control the temperature of the bubbler and associated stainless steel piping leading to the first tube furnace (i.e., heated reaction zone). Additional valves 130 and 135 can control the flow of argon 122 through the bubbler system and to the first tube furnace 140.

Figure 1:
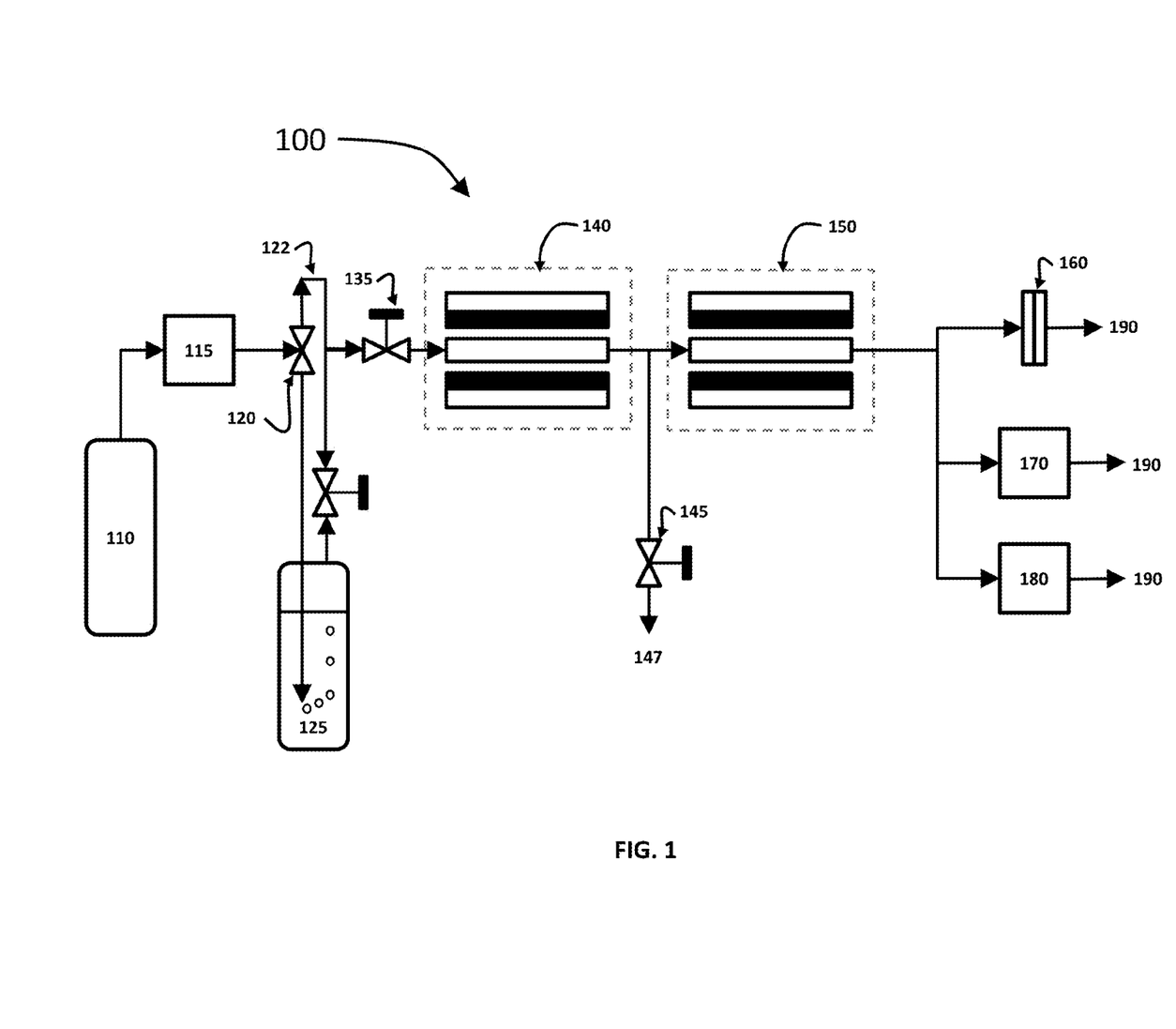
FIG. 1 illustrates a schematic of an exemplary of an aerosol synthesis system for the preparation of aluminum nanocrystals, in accordance with various aspects of the present disclosure.

The outlet of the bubbler 125 is connected via SWAGELOK® tube fittings to 0.5 inch stainless steel piping and then to a 1 inch diameter quartz tube positioned in a 15.5 inch long tube furnace 140 set at 350° C. A dump valve 145 is disposed between the first tube furnace (e.g., heated reaction zone) and a second tube furnace 150 (e.g., second heated zone).

The resulting nanosized aluminum particles can be collected on a membrane filter 160, or sampled for analysis via an aerosol sampler 170 or SMPS 180, with the remaining argon gas containing any reaction byproducts or unreacted aluminum precursor vented as exhaust 190.

Example 3

Nanosized Aluminum Particles

Figure 2A:
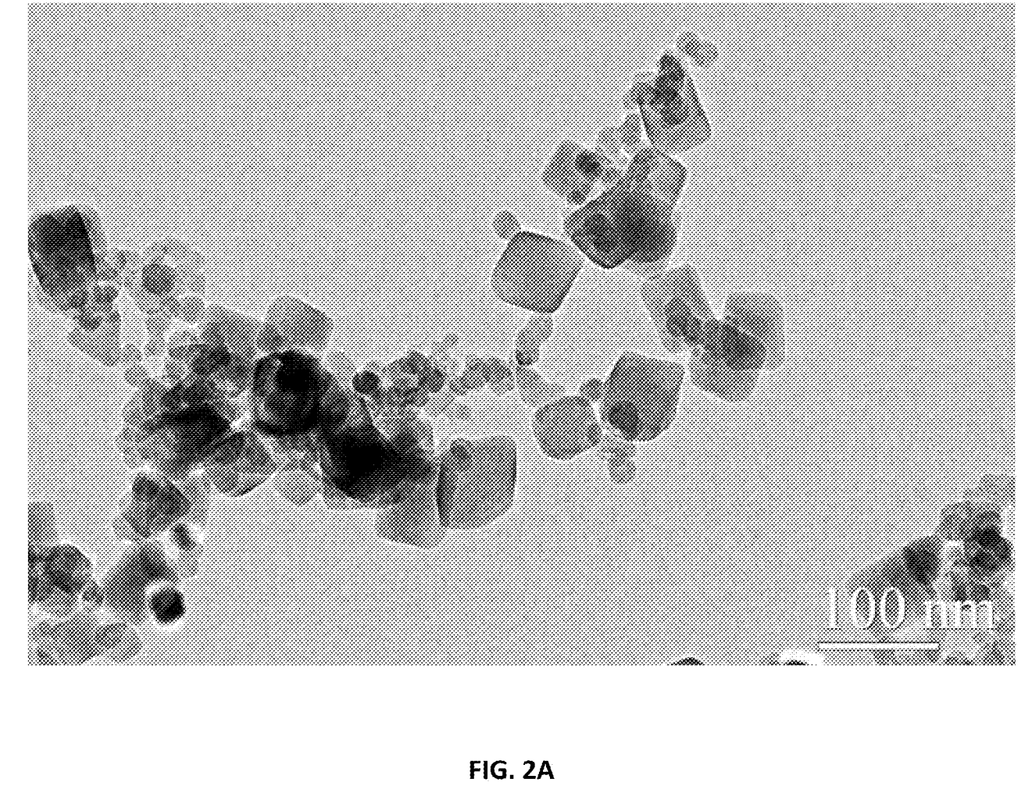
FIG. 2 illustrates transmission electron micrographs of aluminum particles prepared from: a) a single tube furnace at 350° C. with a 3 lpm flow rate of argon, b) a single tube furnace at 500° C. with a 3 lpm flow rate of argon, and c) a first tube furnace at 350° C. with a 3 lpm flow rate of argon and a second tube furnace at 500° C. with 1.5 lpm flow rate of argon, in accordance with various aspects of the present disclosure.
Figure 2B:
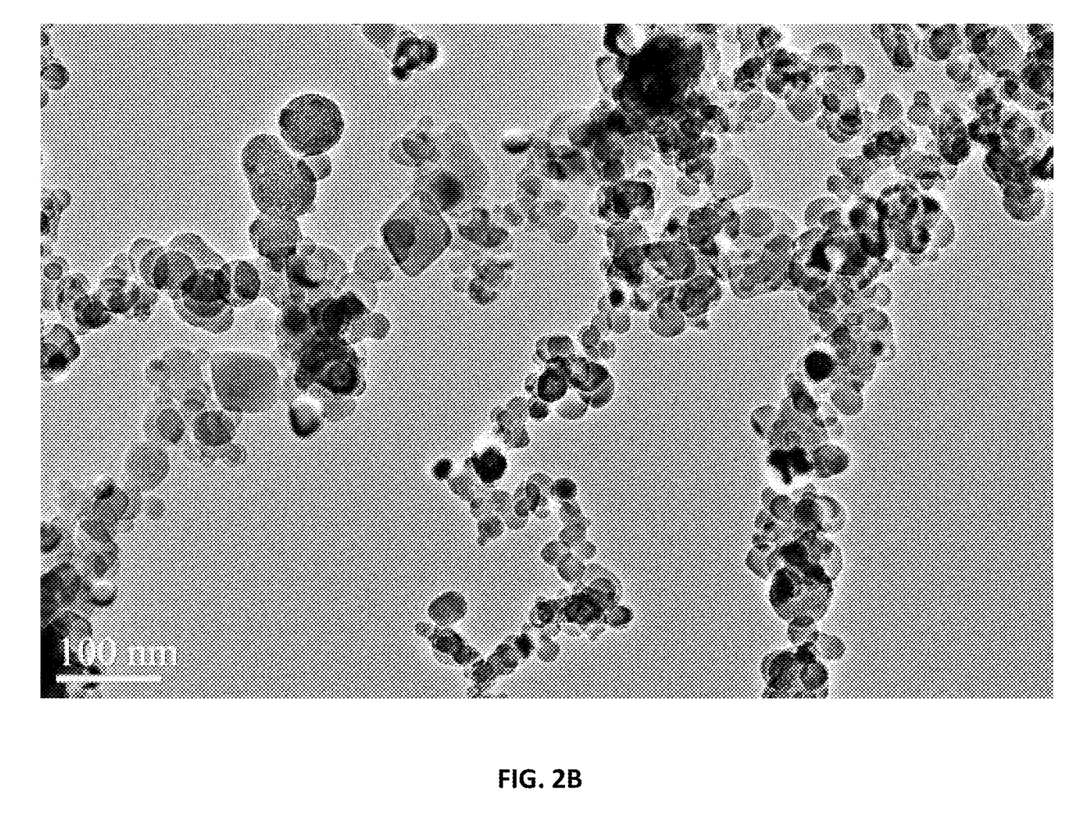
Figure 2C:
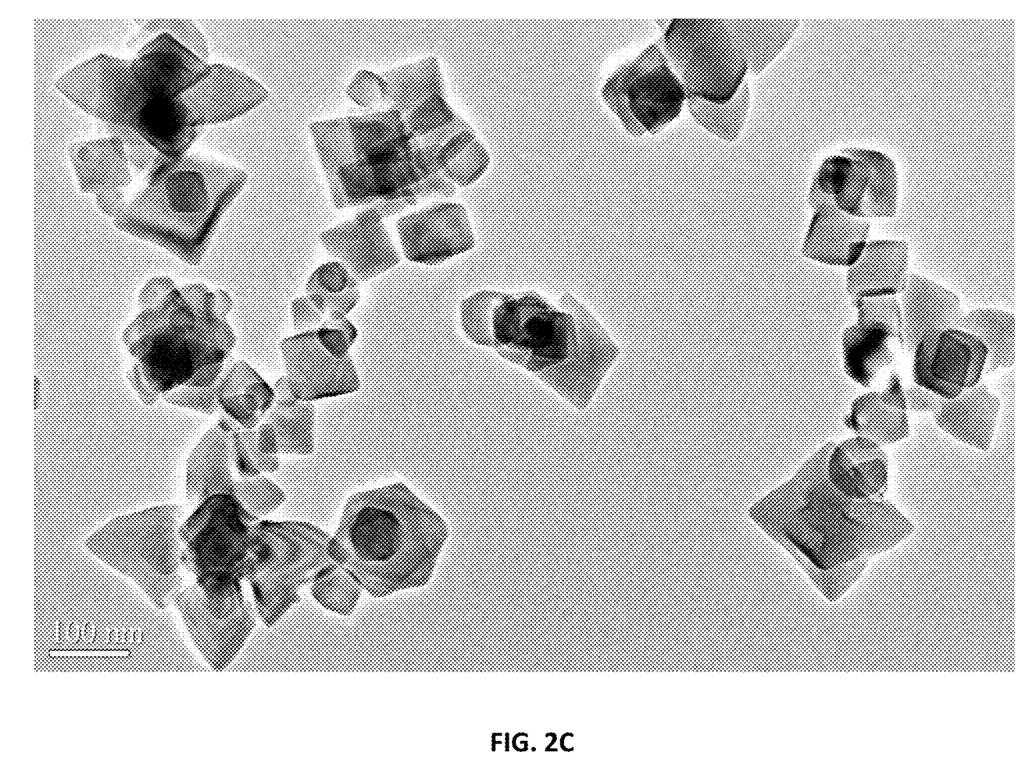

In a third example, a gray powder was produced using one tube furnace at 350° C., an argon flowrate of 3 lpm, and a bubbler temperature of 60° C. Inspection of these particles via transmission electron microscopy with a JEOL JEM 2100F TEM/STEM showed both spherical and polyhedral particle morphologies. Increasing the temperature of the first tube furnace (e.g., heated reaction zone) to 500° C. yielded primarily spherical particles, whereas an experimental setup comprising a first tube furnace (e.g., heated reaction zone) at 350° C. with a flowrate of 3 lpm, and a second tube furnace (e.g., second heated zone) for annealing at 500° C. with a flowrate of 1.5 lpm produced primarily polyhedral particles, as illustrated in in FIG. 2. FIG. 2A illustrates the mixture of spherical and polyhedral particles produced in a single tube furnace at 350° C. (Ar flow 3 lpm; approximately 46.6% polyhedral particles). FIG. 2B illustrates the primarily spherical particles produced in a single tube furnace at 500° C. (Ar flow 3 lpm). FIG. 2C illustrates the particles (approximately 92% polyhedral particles) produced using a first tube furnace at 350° C. (Ar flow 3 lpm), followed by a second tube furnace at 500° C. (Ar flow 1.5 lpm).

Figure 3:
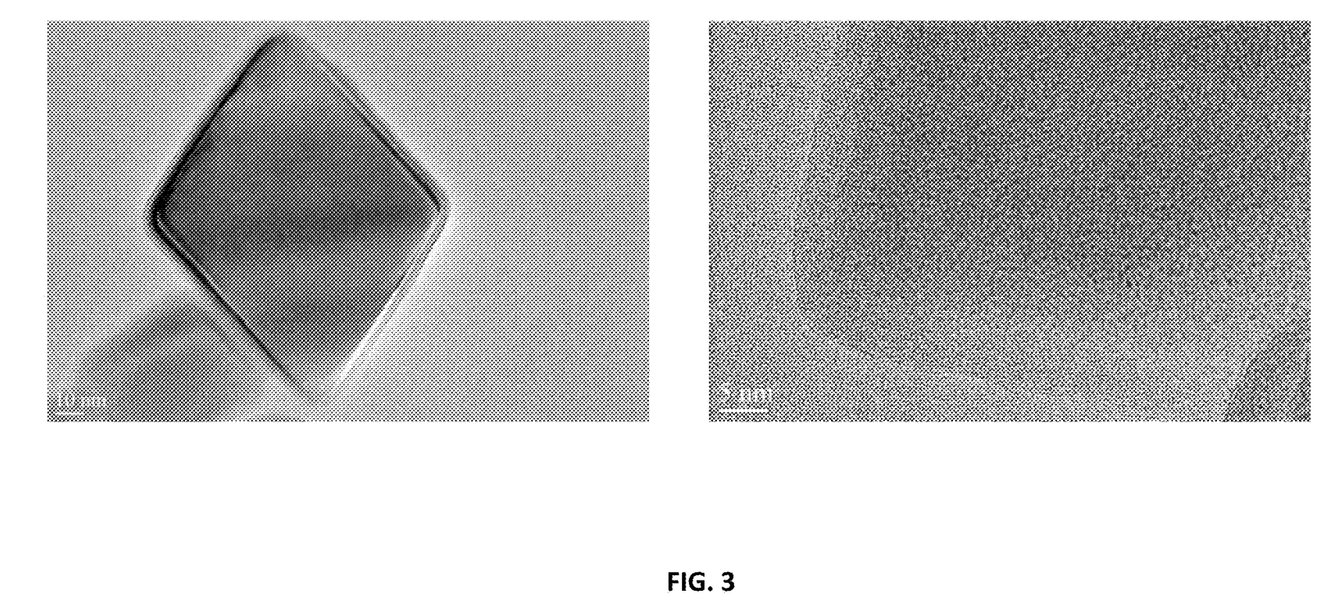
FIG. 3 illustrates high resolution transmission electron micrographs of rectangular aluminum particles having about a 4 nm oxide shell formed during an air bleed, in accordance with various aspects of the present disclosure.
Figure 4:
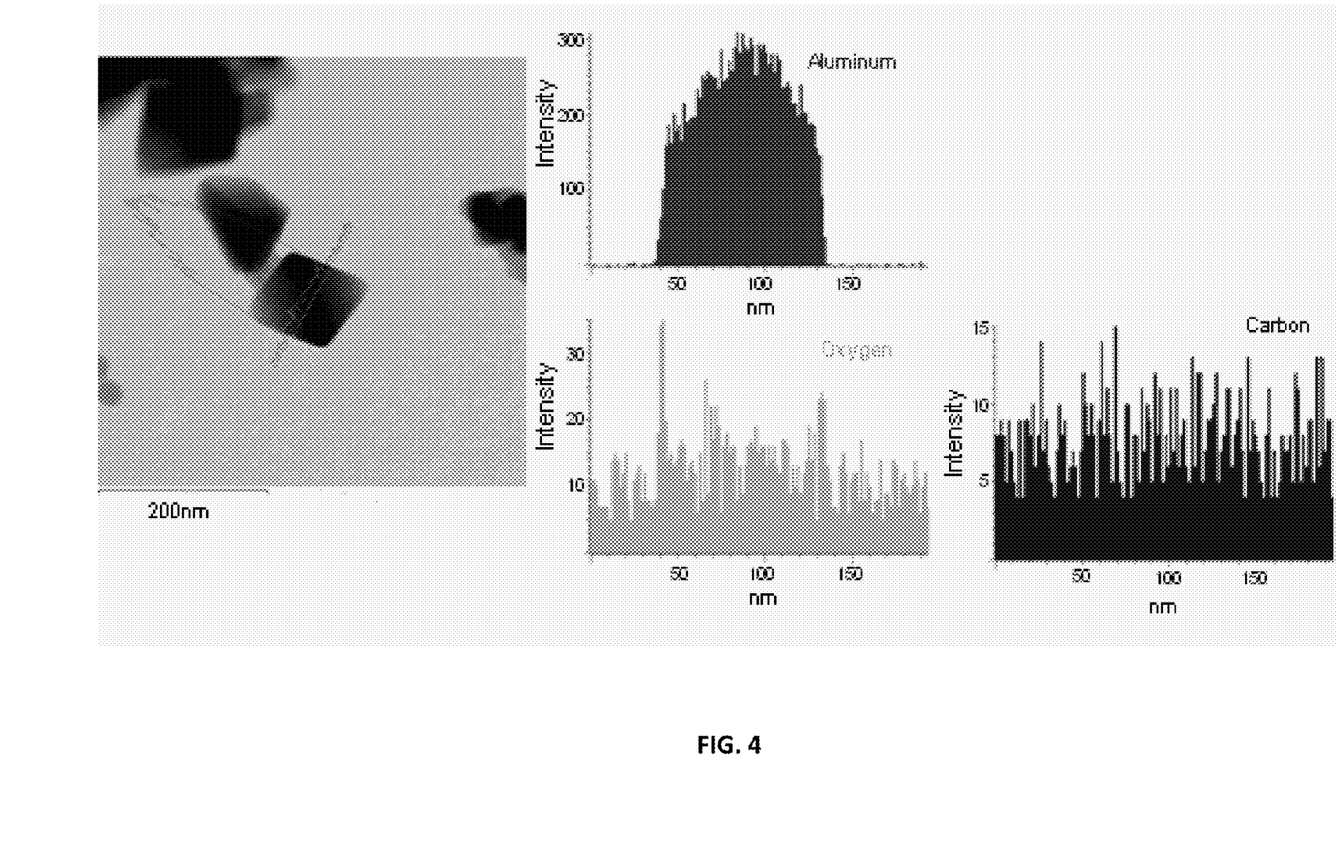
FIG. 4 illustrates energy dispersive x-ray spectroscopy data of a polyhedral aluminum particle, comparing aluminum, oxygen, and carbon intensity, in accordance with various aspects of the present disclosure.
Figure 5:
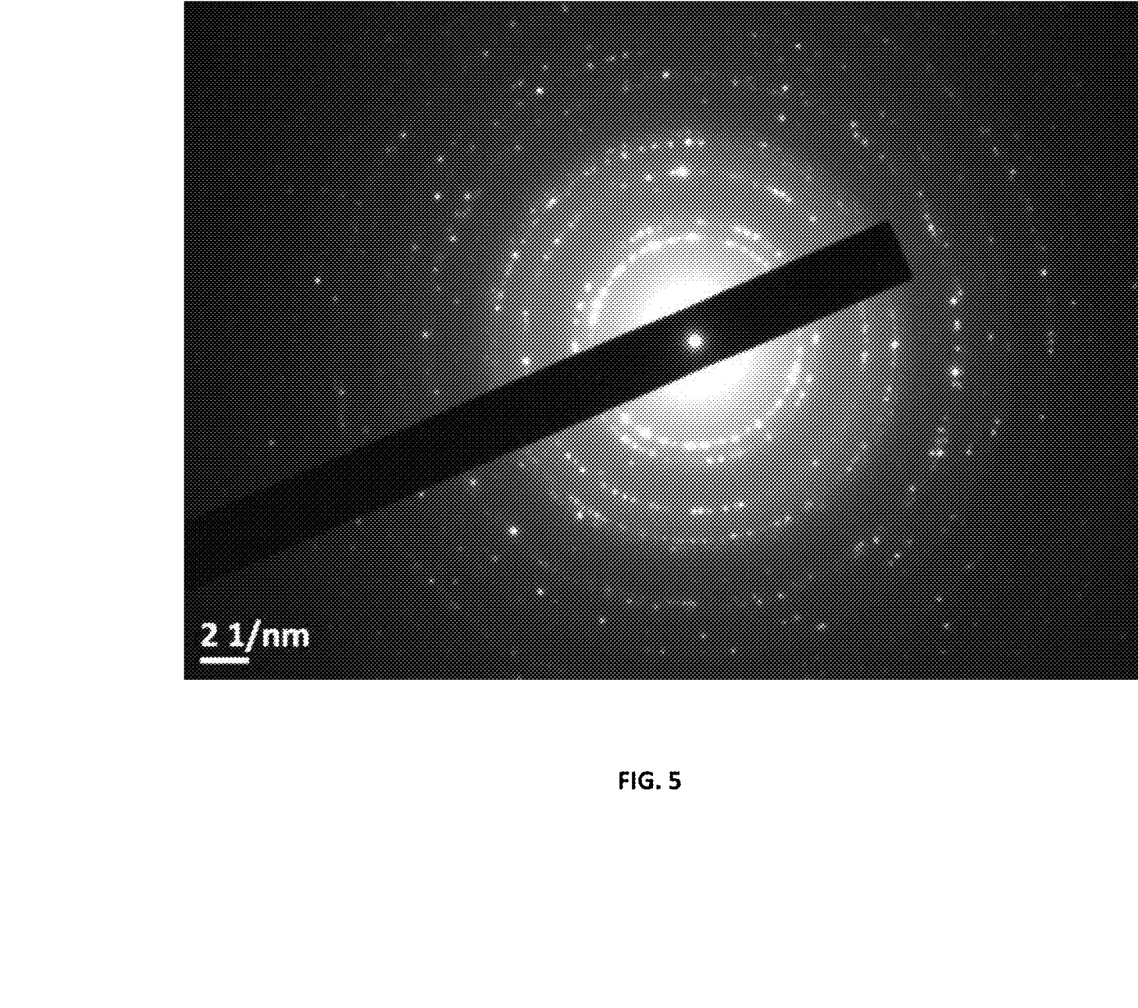
FIG. 5 illustrates an x-ray diffraction image of a polyhedral crystalline aluminum particle, prepared in accordance with various aspects of the present disclosure.

To investigate the composition of the polyhedral particles, high resolution imagery and energy dispersive spectrometry (EDS) were employed, as illustrated in FIG. 3A. The high resolution image in FIG. 3A illustrates the crystalline phase in the middle of the particle. FIG. 3B illustrates the ~4 nm oxide shell formed on the surface of polyhedral aluminum crystals during an air bleed. Line spacing measurements of 0.228 nm in the crystalline phase are consistent with the literature value of 0.233 nm for <111> crystalline aluminum. To confirm, diffraction patterns and EDS line scans were obtained for the product and are shown in FIGS. 4 and 5. The line scan of a polyhedral particle exhibits a clear peak of aluminum, no rise in carbon intensity, and a slight increase of oxygen intensity at the edges of the particle. The experimental diffraction pattern shows clear diffraction rings, with the first three ring diameters from the center yielding lattice spacings of 0.239, 0.201, and 0.143 nm. These match with crystalline aluminum lattice distances of 0.233, 0.203, and 0.143 nm for the <111>, <200>, and <220> planes, respectively. This information combined with the measurements from the high resolution image lead to the conclusion that the polyhedral particles are crystalline aluminum with an amorphous aluminum oxide coating.

The spherical particles seen in FIGS. 2A and 2B were originally hypothesized to be amorphous carbon contamination particles that had formed during the cracking of TiBAl. However, attempts at carbon reduction by hydrogen addition at concentrations of up to 10 mass % showed no discernable effect. High resolution images and EDS line scans of the spherical particles are shown in FIGS. 6 and 7.

Figure 6:
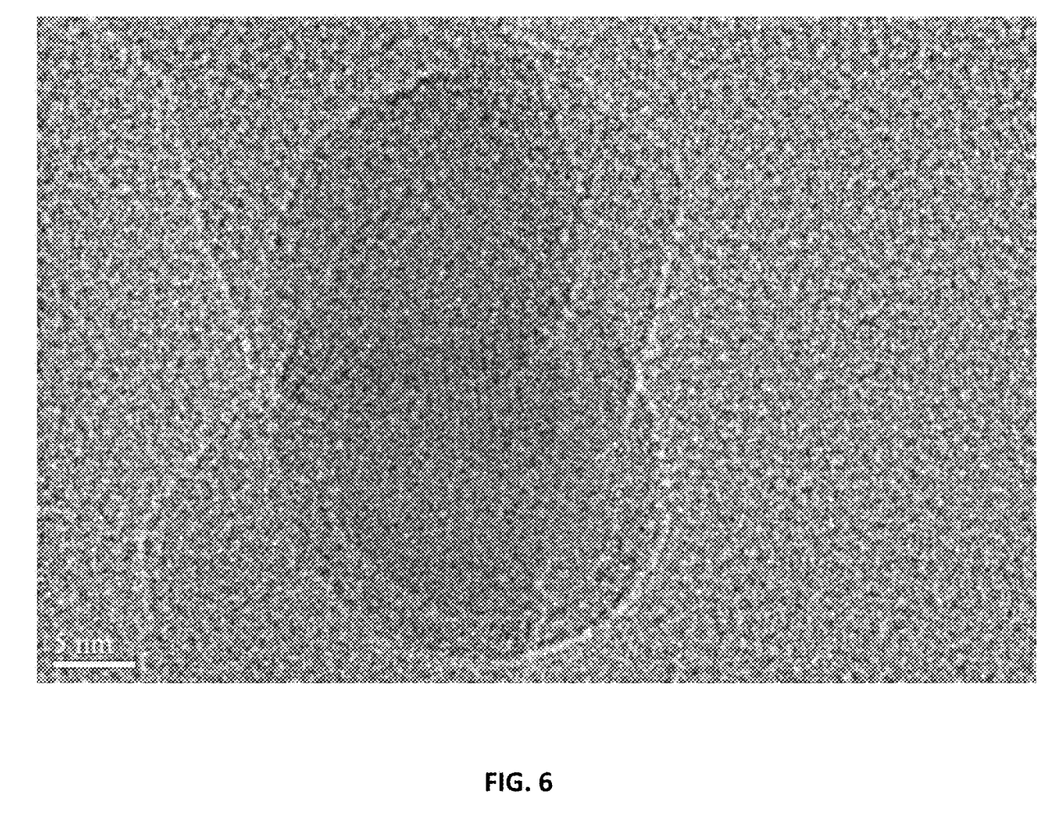
FIG. 6 illustrates a high resolution transmission electron micrograph of a spherical aluminum particle, in accordance with various aspects of the present disclosure.
Figure 7:
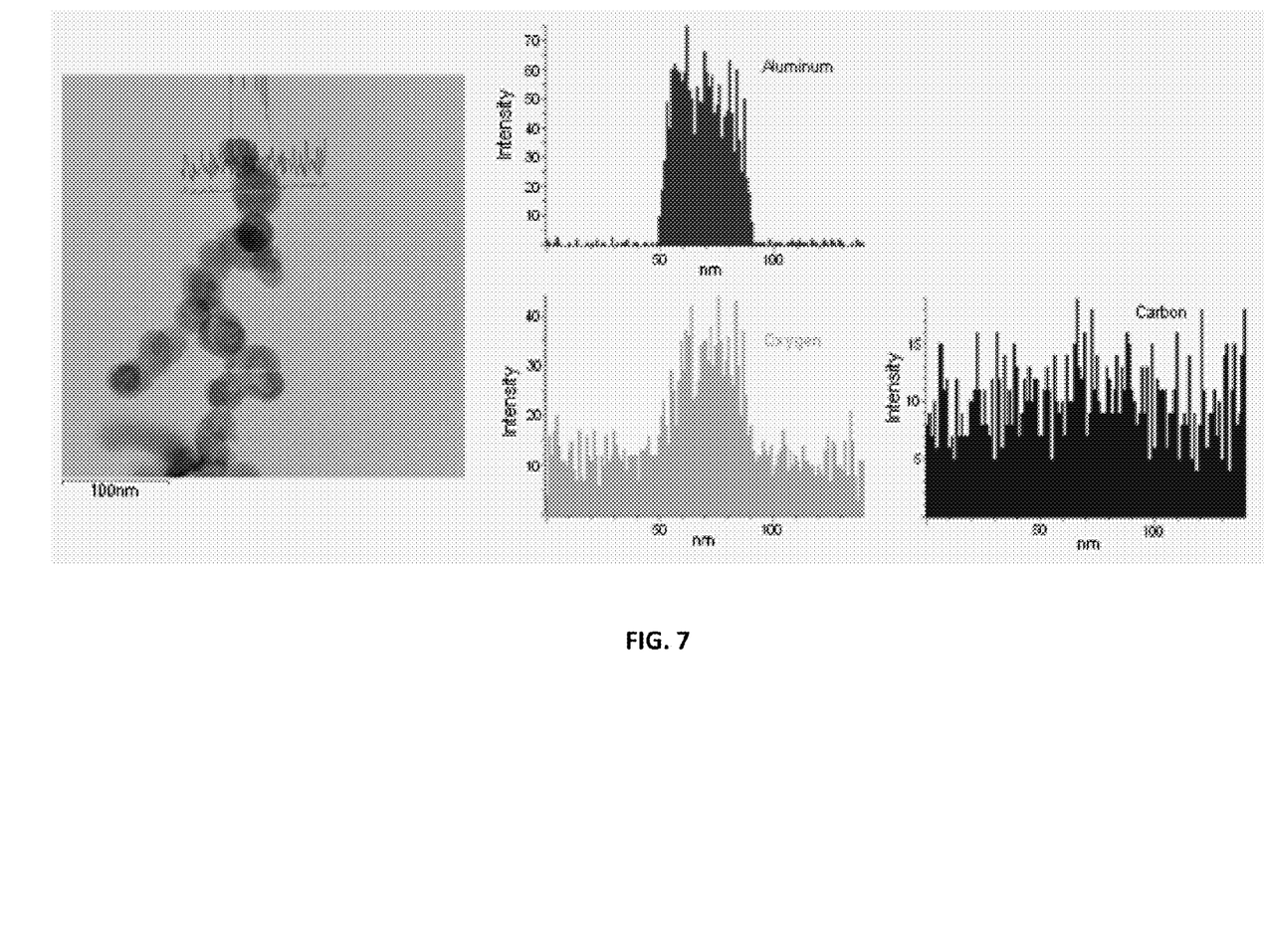
FIG. 7 illustrates energy dispersive x-ray spectroscopy data of a spherical aluminum particle, comparing aluminum, oxygen, and carbon intensity, in accordance with various aspects of the present disclosure.

The high resolution image in FIG. 6 illustrates the substantial amorphous character. The line scan in FIG. 7 confirms that these are aluminum oxide with little carbon contamination. Since oxygen is not available to the particles until the outlet of the production system, it can be concluded that these small spherical aluminum particles are extremely reactive and that even with an oxygen bleed they have, in most cases, fully reacted with oxygen upon exposure. Portions of the core of some of these particles remain as unreacted aluminum, causing the crystal lattice lines in the high resolution images. This could be an indication that these spherical particles were pure aluminum before exposure and reaction with oxygen. When process conditions were changed to yield mostly spherical particles, the resulting samples burned completely upon exposure, even after a slow air bleed. Samples produced with mostly polyhedral crystalline particles, however, did not burn upon exposure after the bleed, indicating that the polyhedral crystals have higher stability than the spherical particles.

Example 4

Stability and Reactivity

In a fourth example, the reactivity of the polyhedral crystalline particles prepared in accordance with the methods described herein, was evaluated. Samples of polyhedral aluminum crystals were combined with stoichiometric amounts of CuO and burned in a pressure cell, a closed stainless steel chamber with ports connected for measurement of optical and pressure response during combustion. The resulting optical response is compared to the response from a commercially available aluminum/CuO material (~50 nm diameter, containing 70% unreacted aluminum as determined by TGA, obtained from Argonide Corporation) in FIG. 8.

Figure 8:
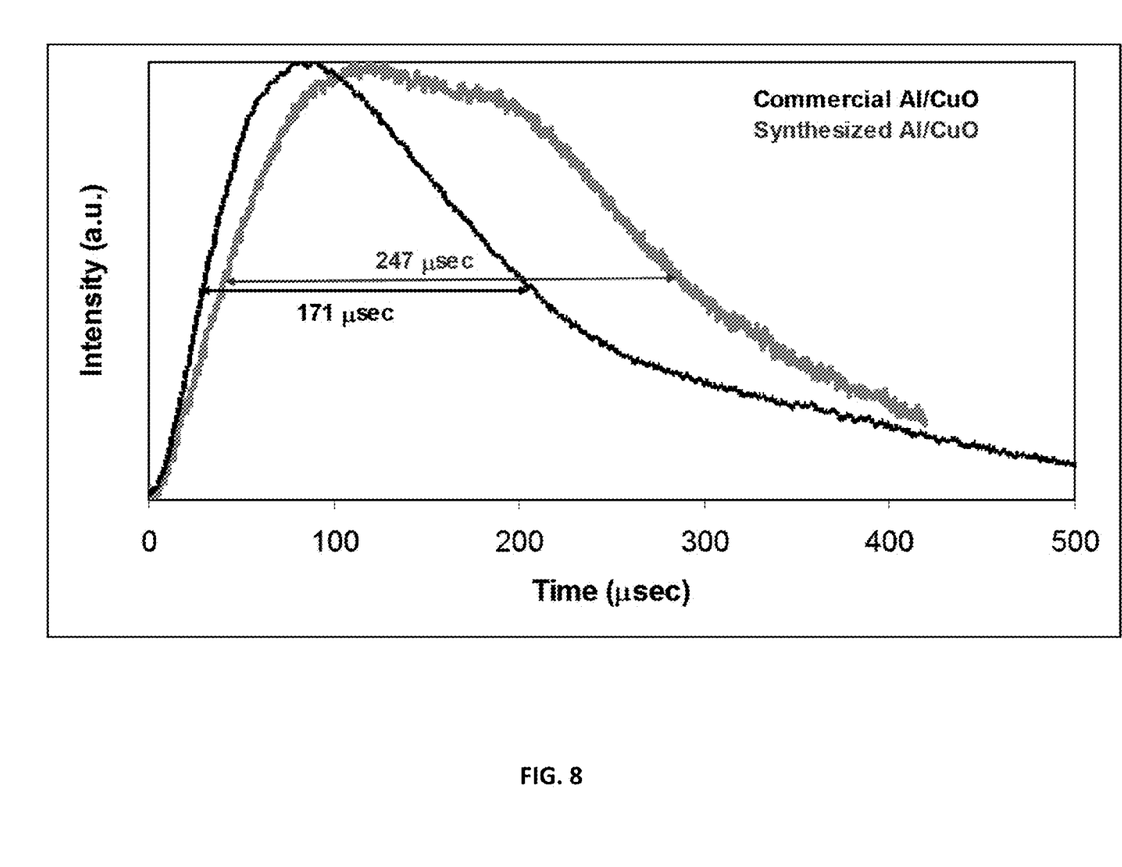
FIG. 8 compares the optical response from the combustion of inventive and commercially available aluminum particles combined with CuO, in accordance with various aspects of the present disclosure.

The broader peak for the inventive nanosized polyhedral aluminum crystals suggests that either the polyhedral crystalline particles ignite at a higher temperature after the spherical particles in the sample have started burning, or that the polyhedral particles actually have longer burn times than standard nanoaluminum. While not wishing to be bound by theory, the enhanced stability of the inventive particles can be attributed to the higher surface binding energy for molecules on a flat surface compared to that of a curved surface due to the Kelvin effect.

Pressure response from these experiments showed a maximum pressure rise of 166 psi for the inventive nanosized polyhedral aluminum crystals compared to a value of 116 psi for the commercially available aluminum product, both with similar rise times. The polyhedral particles yielded a significant enhancement in reactivity, as compared to the commercially available material. Thus, the inventive material exhibits both enhanced stability and increased energy release over conventional aluminum materials.

Figure 9:
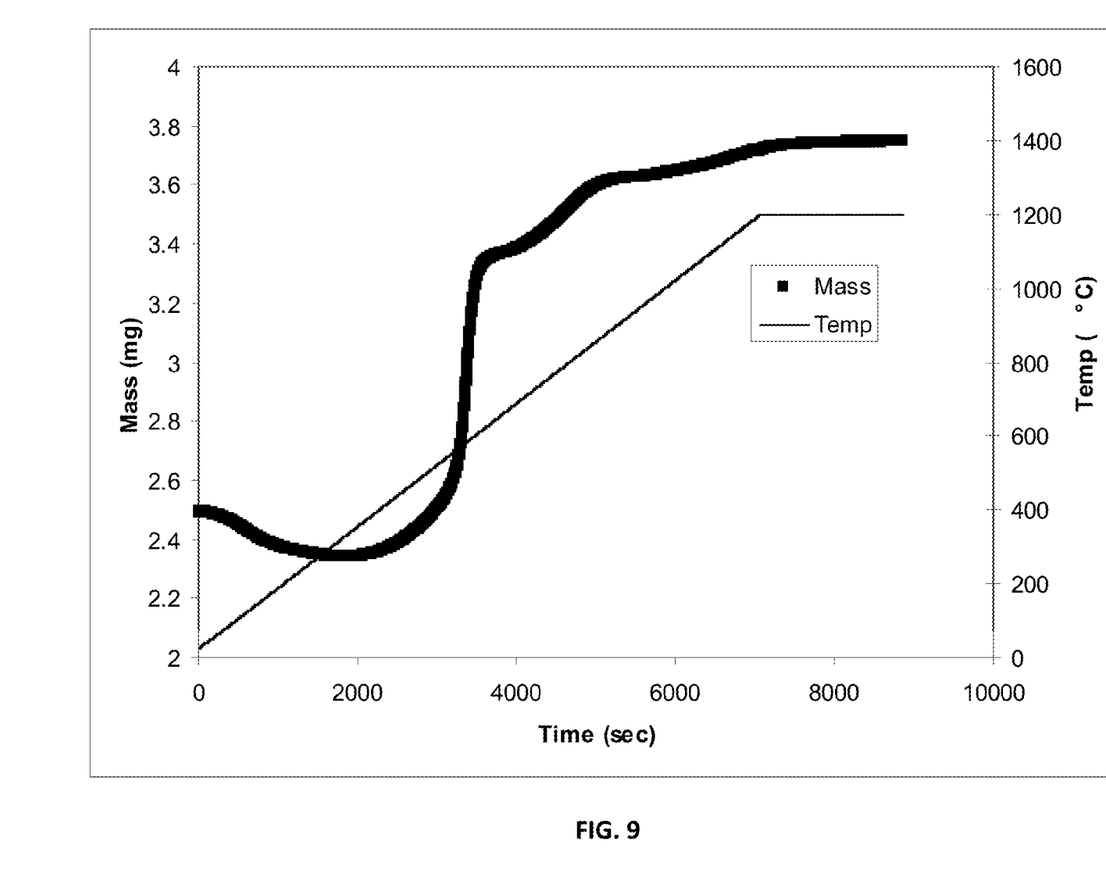
FIG. 9 illustrates thermogravimetric analysis results for aluminum particles prepared in accordance with various aspects of the present disclosure.

Thermal gravimetric analysis (TGA) in air was employed to further scrutinize inventive polyhedral aluminum particle samples produced by the methods described herein to determine the remaining active aluminum content after formation of passivating oxide shells. The resulting mass measurement is illustrated in FIG. 9, as the temperature was raised to 1,200° C. at 10° C./min, and then held for 30 minutes.

These results show an active Al content of 63.9%, a value slightly lower but comparable to the 70% content measured for commercial nano Al in TGA. Thus, the aluminum crystals produced from these experiments have a slightly lower active content but still give an enhanced energy release upon reaction with CuO. Thus, the inventive process can provide, in one aspect, a higher sample of nanosized aluminum crystals having a higher fraction of polyhedral shaped particles than can be obtained using conventional processes. In various aspects, such a sample having a higher percentage, for example, a least about 75%, 80%, 85%, 90%, 92%, 94%, 96%, or more, of polyhedral particles can exhibit a longer burn time than a sample comprising a higher fraction of spherical particles, a higher ignition temperature, or a combination thereof. Thus, such a sample of primarily polyhedral particles can be more stable than conventionally produced aluminum particles and can exhibit a larger energy release when desired.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for preparing nanosized aluminum particles, the method comprising heating a vapor phase aluminum precursor at a temperature and for a period of time sufficient to convert at least a portion of the vapor phase aluminum precursor to nanosized aluminum particles, wherein the vapor phase aluminum precursor comprises triisobutylaluminum.

2. The method of claim 1, wherein heating comprises a temperature less than about 660° C.

3. The method of claim 1, wherein heating comprises a temperature less than about 500° C.

4. The method of claim 1, wherein the vapor phase aluminum precursor is prepared by contacting an inert gas with an aluminum precursor material or a solution comprising the aluminum precursor material.

5. The method of claim 4, wherein the vapor phase aluminum precursor comprises a triisobutylaluminum aerosol in argon.

6. The method of claim 1, wherein the vapor phase aluminum precursor is heated at temperature of about 350° C.

7. The method of claim 1, wherein heating comprises introducing the vapor phase aluminum precursor into a tube furnace.

8. The method of claim 7, further comprising first heating the vapor phase aluminum precursor at a temperature wherein substantially no decomposition occurs, and then heating the vapor phase aluminum precursor at a temperature sufficient to at least partially decompose the vapor phase aluminum precursor.

9. The method of claim 1, further comprising heating the nanosized aluminum particles to anneal at least a portion of the particles.

10. The method of claim 9, wherein heating the nanosized aluminum particles comprises heating at a temperature greater than the temperature used to convert the vapor phase aluminum precursor and less than about 660° C.

11. The method of claim 9, wherein heating the nanosized aluminum particles comprises heating at a temperature of from about 350° C. to about 500° C.

12. The method of claim 1, wherein the vapor phase aluminum precursor is heated at about 350° C. to form nanosized aluminum particles, which are subsequently heated at an elevated temperature relative to the temperature prior to the subsequent heating.

13. The method of claim 1, further comprising contacting the nanosized aluminum particles with a quantity of oxygen sufficient to form a passivating oxide layer on a surface thereof.

14. A method for preparing nanosized aluminum particles, the method comprising heating a vapor phase aluminum precursor at a temperature of about 350° C. to about 660° C. and for a period of time sufficient to convert at least a portion of the vapor phase aluminum precursor to faceted nanosized aluminum particles.

* * * * *